United States Patent Office 3,452,527
Patented July 1, 1969

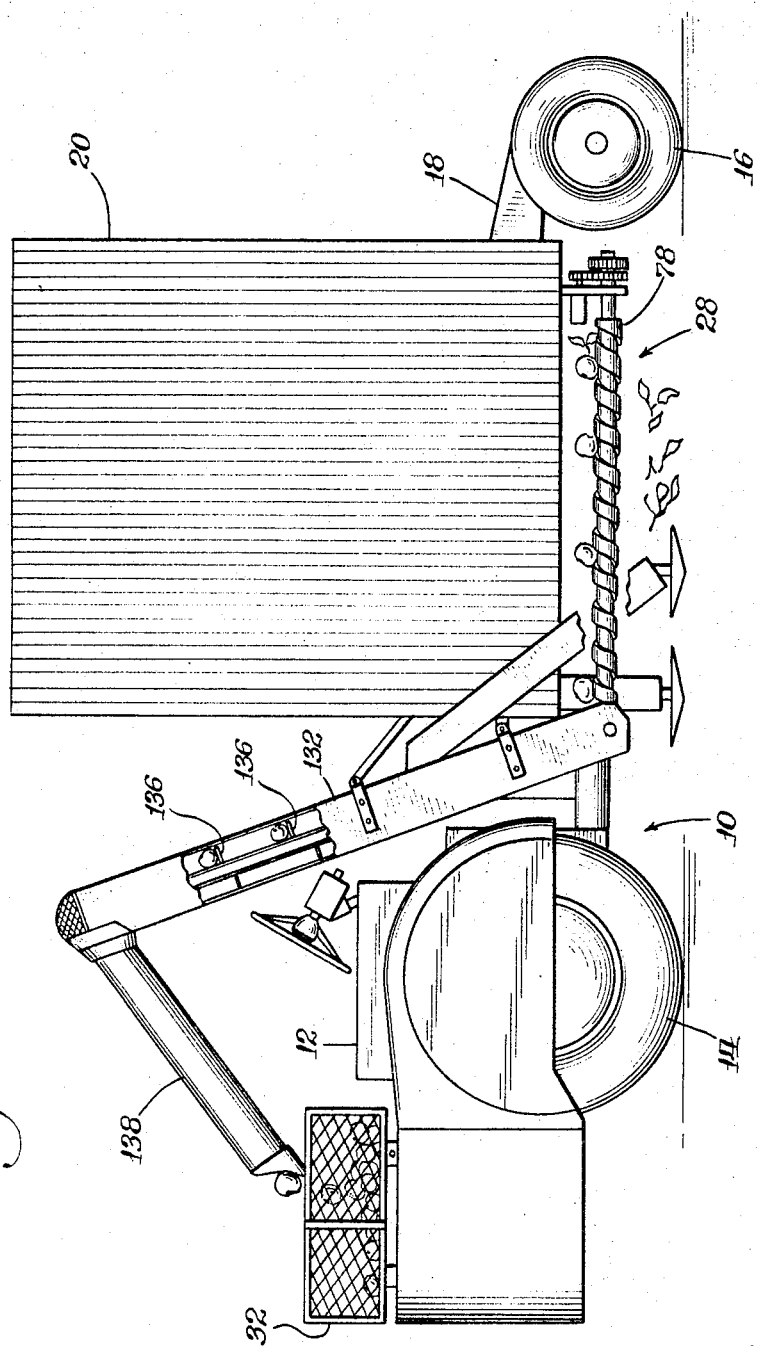

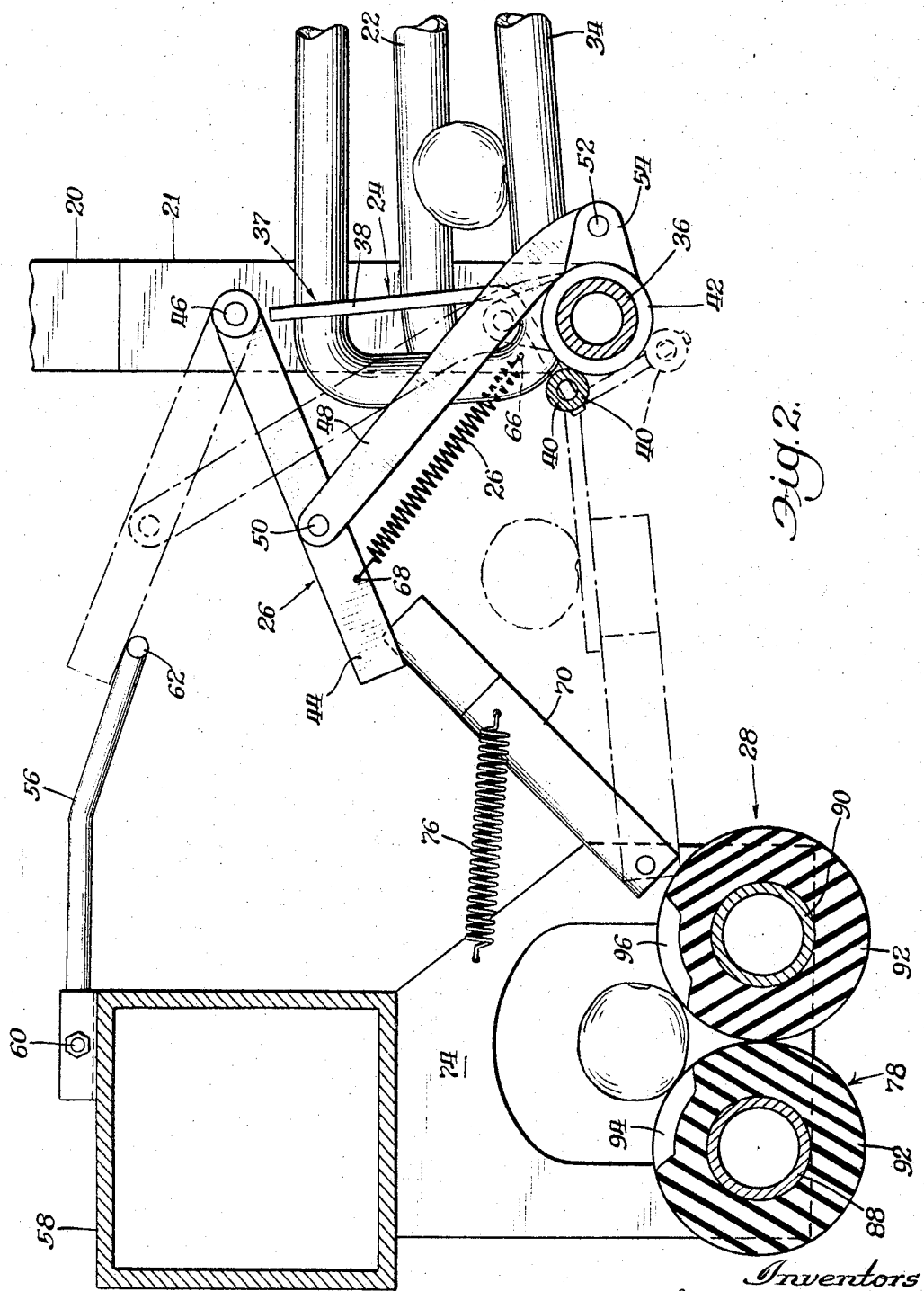

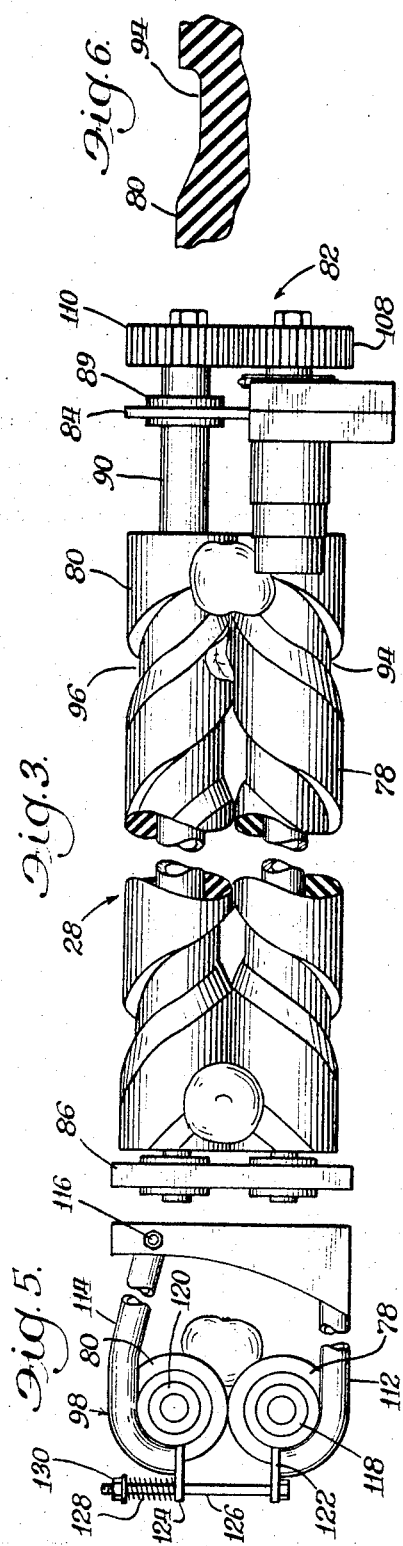
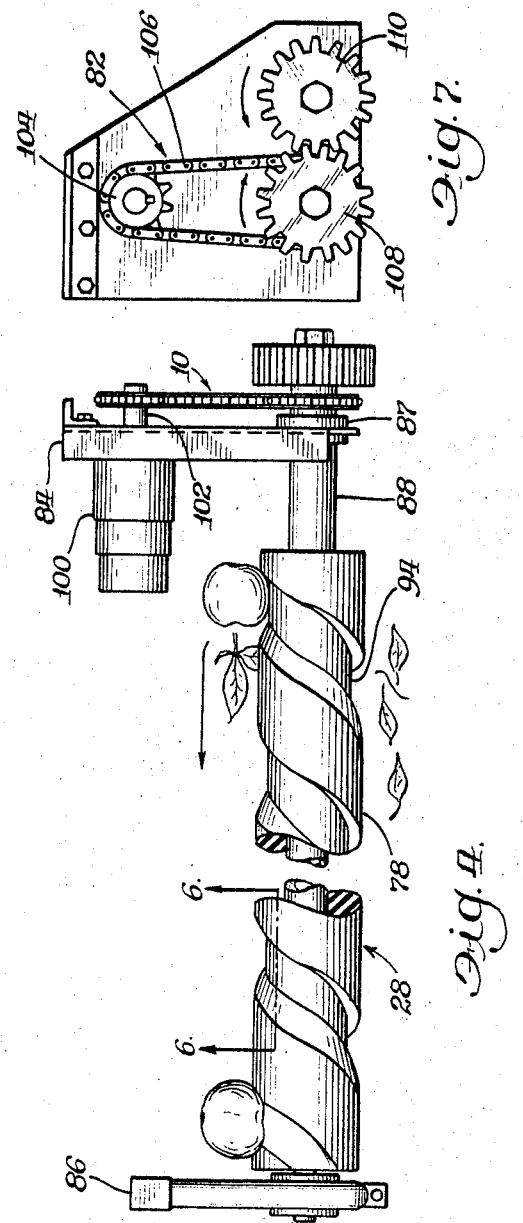

3,452,527
FRUIT HANDLING APPARATUS
Richard R. Steingas, Naperville, and John F. Reynolds, Downers Grove, Ill., assignors to International Harvester Company, Chicago, Ill., a corporation of Delaware
Filed Oct. 17, 1966, Ser. No. 587,182
Int. Cl. A01g 19/00
U.S. Cl. 56—328                    15 Claims

ABSTRACT OF THE DISCLOSURE

A fruit harvester having a picker for harvesting fruit, a container for receiving harvested fruit, a gate for closing and discharging the container, a pair of destemming rollers disposed to receive fruit from the gate, the rollers rotating in opposite directions and having helical grooves for receiving the fruit and advancing it lengthwise of the rollers to a delivery end a conveyor at the delivery end for receiving the fruit and conveying it to a receptacle.

---

This invention relates to a fruit handling system and more particularly to an arrangement adapted to be used with a mobile fruit picking unit which may be moved from tree to tree to pick fruit therefrom.

One of the problems encountered in fruit picking activities in the field as in picking apples, for example, is that stems, leaves and branches adhere to the fruit as it is disengaged from the trees. Accordingly, it would be desirable to clean fruit as nearly perfectly as possible at the time of the actual picking to avoid as much as possible additional cleaning at a time subsequent to the picking.

It is a principal object of this invention to provide a suitable fruit cleaning means which may be used in conjunction with a mobile fruit picking unit.

Another object is to provide an arrangement of rollers over which the picked fruit will travel to have stems and leaves removed therefrom.

Another object is to provide means for conveying cleaned fruit to a storage receptacle associated with the fruit picking unit.

The above and other objects and advantages of the invention will be more readily apparent when considered in connection with the accompanying drawings in which:

FIGURE 1 is a side elevation view of a mobile fruit picking unit embodying the invention;

FIGURE 2 is an end elevation view partially in section showing the cleaning and conveying rollers, the fruit retaining means and the tripping mechanism for the retaining means;

FIGURE 3 is a plan view of the roller cleaning and conveying means;

FIGURE 4 is a view in elevation of the roller cleaning and conveying means illustrating how fruit is carried in the grooves;

FIGURE 5 is an end view of the roller cleaning and conveying means showing a roller tensioning means;

FIGURE 6 is a partial view in section of a portion of one of the rollers taken along the line 6—6 of FIGURE 4; and FIGURE 7 is an end view in elevation showing the drive means for the rollers.

Referring now to the drawings wherein like numerals on the different views identify the same parts 10 indicates generally a fruit harvesting unit 10 mounted on a tractor or other power unit 12 supported on large traction wheels 14 and steerable wheels 16 which are carried at the outer end of frame 18 which is attached to the unit 10. The fruit harvesting unit generally may be of the type disclosed in U.S. Patent 3,153,311 issued on Oct. 20, 1964 to Stuart D. Pool and more specifically may be of the type disclosed in co-pending International Harvester patent application case D7848 filed on Oct. 17, 1966, Ser. No. 587,184.

The fruit harvesting unit 10 includes the fruit picker panel 20, a basket or receptacle 22 disposed under the picker panel retaining means 24, a gate opening or tripping mechanism 26, fruit cleaning means 28, conveyor mechanism 30 and a tank 32 for storing the cleaned fruit.

Generally the operation may be described as follows. After fruit is picked from a tree by the picker spindles on the picker panel as described, for example, in above referred to U.S. Patent 3,153,311, the panel 20 is returned to its transporting position. During this return movement, the tripping mechanism 26 is actuated and is effective to open the retaining means 24 mounted at the rear of the receptacle 22. This permits fruit to move to the cleaning means 28 where it is destemmed and leaves and branches removed. The cleaning means 28 during its operation also moves the fruit to conveyor means 30 which deposits the cleaned fruit in the basket or tank 32. The fruit can then be removed from the latter as appropriate.

The receptacle 22 is attached to the bottom portion of the picker panel 20 and may comprise a plurality of bars or rods 34 forming the bottom thereof. These are attached by suitable means such as welding to a transversely extending support member, here shown as a hollow tube 36. The tube 36 has its ends fixedly supported on extensions 21 of the picker panel.

The fruit retaining means 24 is disposed at the rear of the basket 22 and is pivotally mounted on the tube or rod which is circular in cross-section. The retaining means 24 is a gate or end wall structure 37 comprising a plurality of retaining fingers 38 formed substantially in a backward L-shape as viewed in FIGURE 2. In a fruit retaining position these fingers 38 extend vertically and are horizontally spaced along the tube 36. They are each secured on a transversely extending bar or tube 40. The bar 40 is secured by suitable means, such as welding, to a plurality of rings 42 which are horizontally spaced on and rotatably mounted on the tube 36 in a bearing relationship. The horizontal spacing of the fingers 38 is close enough to prevent small fruit such as apples, for example, from rolling out of the basket. As an alternative, a solid retaining wall such as sheet metal strip may replace the fingers 38. The wall would also be mounted on the rings 42 so as to be rotatable therewith.

The tripping mechanism 26 is used to open the basket 22 by moving the retaining fingers to make a slight downwardly extending angle with the horizontal as shown by the dotted lines in FIGURE 2. This allows the fruit to roll out of the basket and down the retaining wall fingers 38 as a ramp onto the cleaning means 28. The tripping mechanism 26 comprises a pair of identical linkage arrangements disposed at each side of basket 22, only arrangement 27 being shown. The linkage 27 comprises actuating arm 44 pivotally mounted at 46 on the picker panel extension 21 and extending rearwardly of the picker panel. One end of a link 48 is pivotally connected at 50 to the actuating arm 44 intermediate the ends thereof. The other end of link 48 is pivotally connected at 52 to an arm 54 fixed to or integrally forming a part of one of the rings 42. As will be observed from FIGURE 2 upward or clockwise movement of arm 44 about its pivot 46 causes counterclockwise rotation of arm 54 and the ring 42 to which it is attached. The linkage arrangement on the opposite side of the basket 22 is the same and operates in the same manner. Since the retaining wall structure 37 is secured to rings 42 through the bar or tube 40 it will be rotated counterclockwise as viewed in FIG- URE 2 to the dotted line or open position when the arms 54 are rotated counterclockwise.

The gate 37 is opened to the dotted line position of FIGURE 2 by lowering the picker panel 20 from a position which is relatively higher than shown in FIGURE 2. During the lowering movement of the panel 20 the arm 44, which would be in the same relative position with respect to panel extension 21 as shown in the full line position of FIGURE 2, comes into contact with tripping arm 56 which is attached to transversely extending frame member 58 which is supported by suitable means (not shown) on the frame 18. The arm 56 extends outwardly from the frame member 58 and is pivotally mounted at 60 so that it can swing upwardly but not downwardly from the position shown in FIGURE 2. An extension 62 is formed on the outer end of arm 56 extending substantially horizontally and at approximately right angles thereto. It is this extension 62 which the arm 44 contacts during downward movement of the picker panel 20 to retain the arm 44 in the up or dotted line position thereby rotating arm 54, rings 42 and the gate structure 37 to the open position. A tension spring 64 is connected by one end 66 to the basket 22 and by the other end 68 to the arm 44 to normally hold the arm 44 in the full line position and thus the gate 37 in an upward or closed position.

The position of the picker panel 20 as shown in FIGURE 2 is in its fully retracted position. It would be moved to the right from this position to move it into a tree for a picking operation. The picker panel must be in this fully retracted position to operate the gate opening mechanism. In the event that the panel 20 is retracted in its lowered position as shown in FIGURE 2, it must be moved vertically to place the actuating arm 44 above the tripping arm 56 before the gate 37 can be opened. In moving the panel 20 vertically upward the arm 44 will contact extension 62 on the underside causing arm 56 to pivot upwardly against the tension of a spring means (not shown) or other yieldable means designed to hold the arm 56 in substantially the position shown. Then a downward movement of the panel 20 will cause the arm 44 to contact the upper side of extension 62 to restrain the arm 44 in the upward dotted line position.

The gate fingers 38 are long enough so that when the gate is opened, the outer ends contact a platform 70 pivotally mounted on the frame structure and preferably at 72 on brackets 74 to swing it downwardly to the dotted line position to form a complete platform extending between the basket and roller cleaning means 28. The brackets 74 are secured at opposite ends of the frame member 58. Tension spring means 76 connected between the bracket 74 and platform 70 normally holds the platform in the upward or full line position.

The fruit cleaning means 28 comprises generally a pair of rollers 78 and 80 and roller driving means 82. The rollers 78 and 80 are elongated rollers mounted side by side with their longitudinal axes parallel and lying in a substantially horizontal plane. The rollers preferably are long enough to extend the full width of the basket 22 mounted under the picker panel. They are positioned to the rear of the picker panel and may be rotatably journalled at opposite ends in bearings associated with brackets 84 and 86 which are attached to frame member 58 by suitable means (not shown). Bearings 87 and 89 support the ends of roller shafts in bracket 84. The rollers are positioned slightly lower than the basket 22 so that fruit may move by gravity from the basket to the rollers via the downwardly swung gate 37 and platform 70.

The rollers 78 and 80 comprise shafts 88 and 90 respectively which may be tubular. They are each covered by similar material 92 such as hard rubber. Even if another material is used it should have a relatively high coefficient of friction to assist in moving the fruit along the rollers as well as aiding in the cleaning process. The rollers 78 and 80 are of equal diameters and this preferably ranges from three to four inches.

The surface of each of the rollers 78 and 80 has formed therein helical or spiral-like grooves 94 and 96 respectively encircling the rollers generally in the form of a screw thread. The grooves are of equal pitch and are formed in opposite directions around the rollers as clearly seen in FIGURE 3, that is, they resemble right and left hand thread formations. The depth of these grooves may be approximately ⅝". During operation the rollers are rotated in opposite directions toward each other as shown by the arrows in FIGURE 7. The rollers are positioned with respect to each other so that during rotation of the rollers the matching helical grooves 94 and 96 maintain a series of V-shapes as seen in FIGURE 3. In FIGURE 6 which shows a cross section of the shape of groove 94 it will be observed that the left or leading edge of the groove 94 is formed at an angle with the outer surface or periphery of the roller. This angle, while not critical, preferably is about 30°. This would also be expressed as the angle that $a$ makes with the axis of the roller. This angularity assists the movement of fruit along the rollers toward the left end of the rollers as viewed in FIGURE 3 when the rollers are rotated in their normal direction of operation as shown in FIGURE 7.

As best seen in FIGURE 2, the rollers 78 and 80 are positioned in tangential contact with each other along their full length. Thus as the rollers rotate toward each other, stems, branches and leaves are caught between the rollers on their topside, removed from the fruit as the rollers rotate and ejected on the underside of the rollers.

Since the roller surfaces will normally be of a resilient material, the compressive force of the rollers against each other may be varied by a tensioning means 98 described hereinafter in more detail. Thus the compressive forces between the rollers may be varied slightly to accommodate different fruit picking conditions. It is also advantageous to have the roller surfaces of a resilient material to reduce the potential damage that may otherwise be done to the fruit from being bumped along the rollers as it is moved toward the elevator.

The rollers 78 and 80 are driven by the driving means 82 connected to one end of the rollers. The driving means includes a motor 100 preferably of the hydraulic type. It may be mounted on the bracket 84. A shaft 102 driven by the motor 100 has a spur gear 104 connected thereto. The gear 104 transmits a drive to shaft 88 through chain 106 and a gear (not shown) mounted on shaft 88. Gears 108 and 110 are secured by suitable means to shafts 88 and 90 respectively and are in mesh with each other. Thus when shaft 88 is driven in a clockwise direction as viewed in FIGURE 7, shaft 90 and gear 110 attached thereto are driven in a counterclockwise direction at the same speed.

The tensioning means 98 disposed at the other end of the rollers from the driving means 82 comprises a pair of arms 112 and 114 secured to the bracket 86. One of the arms, such as 112, may be permanently fixed to the bracket and the other, such as 114, may be pivotally attached thereto at 116. The lower ends of both of the arms 112 and 114 are curved and are adapted to have attached thereto bearings 118 and 120 to support the ends of shafts 88 and 90 respectively. These bearings preferably are of a type which will accommodate misalignment of shafts 88 and 90 such as spherical bearings, for example.

Flanges 122 and 124 are attached to the lower ends of arms 112 and 114 respectively. A bolt 126 extends through the lower ends of flanges 122 and 124 and a coil compression spring 128 is supported on the outer end of the bolt. Thus tensioning of the rollers is accomplished by the tightening or loosening of the nut 30 which will adjust the force of contact between the two rollers. With the compression spring 128, however, a certain flexibility in the alignment of the rollers is allowed which may be necessary if large branches, for example, should be injected into the rollers.

The conveyor mechanism 30 positioned to the left of the picker panel as viewed in FIGURE 1 may comprise a closed chute 132 in which a power operated continuous elevator 134 carrying fruit support members 136 operates. The elevator carries cleaned fruit from the bottom to the top of the conveyor chute 132 to be dumped through the closed trough 138 and into the basket or fruit holding tank 32 mounted on the power unit 10. As viewed in FIGURE 1 the fruit moves to the left on the rollers 78 and 80 due to the matching grooves 94 and 96 and the opposed or counter rotation of the rollers as shown in FIGURE 7.

While the operation of various portions of the unit has been described, an overall summary description of the operation of the unit will now be made. The portion of the picker panel 20 shown in FIGURE 2 is in its fully retracted or transporting position. It is moved to the right to move it into a picking position. When it becomes desirable to empty the basket 22 it is moved back to the left but to a position slightly higher than that shown in FIGURE 2. It is then lowered along the panel supporting frame (not shown), and in this lowering movement the arm 44 catches on the extension 62 of the tripping arm 56 thus retaining the arm 44 in the dotted line position of FIGURE 2. The movement of arm 44 causes the ring 42 with arm 54 attached thereto to rotate counterclockwise. Since the gate retaining wall structure 37 is fixed to the rings 42 the gate also rotates counterclockwise about the pivot bar 36. In doing so it contacts the edge of platform 70 forcing it down to the dotted line position. With the gate 37 now open, fruit can move by gravity to the rollers 78 and 80. The operator of the unit 10 can switch on the motor 100 to cause the rollers to be driven in opposite directions toward each other as viewed in FIGURE 7. As the rollers rotate the stems attached to the fruit are caught between the rollers and pulled from the fruit and released at the underside of the rollers. Branches and leaves are also segregated from the fruit in the same manner. By virtue of helical groove construction, on the surface of the rollers the fruit is continuously advanced to the left end of the rollers as seen in FIGURES 1, 3 and 6 where it is deposited onto the elevator which carries it up the chute 132 dumped into the tank 32 through trough 138. As the fruit passes along the rollers 78 and 80 a certain cleaning and polishing process also takes place which removes surface dirt from the fruit.

Thus it will be apparent that I have advantageously provided a fruit harvesting unit which includes a fruit cleaning device. The fruit cleaning device removes the branches, leaves and stems at the harvesting site and then conveys the fruit to an elevator which carries it to a container associated with the harvesting unit.

While a preferred embodiment of the invention has been specifically disclosed, it is to be understood that the invention is not limited thereto as many variations will be readily apparent to those skilled in the art and the invention is to be given its fullest possible interpretation within the terms of the following claims.

What is claimed is:

1. A fruit harvester comprising:
   means for removing fruit from trees,
   means for receiving the removed fruit,
   a plurality of elongated rollers disposed alongside said receiving means and disposed to receive fruit therefrom and cooperating with each other along their full length, said rollers being adapted to be rotated in opposite directions with respect to each other,
   gate means operative to open said fruit receiving means to discharge fruit to said rollers, said rollers when rotated being effective to remove leaves and stems from fruit which is disposed thereon, and means associated with said rollers for advancing fruit disposed thereon lengthwise on said rollers to a discharge end thereof,
   and means for receiving fruit from the discharge end of the rollers.

2. The fruit harvester of claim 1 wherein:
   said means for advancing fruit include spiral-like groove means associated with the surfaces of said rollers.

3. The fruit harvester of claim 1 wherein:
   said means for advancing fruit include spiral-like grooves formed in the surfaces of said rollers.

4. The fruit harvester of claim 1 which includes:
   a pair of rollers disposed alongside each other and adapted to be placed in rolling contact substantially along their full length, and
   said means for advancing the fruit includes oppositely directed matching helical grooves formed in the surfaces of said pair of rollers.

5. The fruit harvester of claim 1 wherein:
   the leading edges of said helical grooves form an acute angle with the axes of the rollers.

6. The fruit harvester of claim 1 wherein:
   the surfaces of said rollers are of a resilient material.

7. The fruit harvester of claim 6 wherein:
   said resilient material is a hard rubber.

8. The fruit harvester system of claim 1:
   including means for adjusting the tension between the rollers.

9. The fruit harvester of claim 1 wherein:
   said plurality of rollers comprises a pair of rollers disposed alongside each other in a substantially horizontal plane and in rolling contact substantially along their full length,
   said pair of rollers having surfaces of resilient material, and
   said means for advancing the fruit comprises means formed on said roller surfaces defining oppositely directed matching helical grooves for moving fruit along said pair of rollers when they are rotated.

10. A fruit handling system in a fruit harvesting unit of the type having a movable fruit picking panel comprising:
    receptacle means for receiving fruit from a tree,
    gate means associated with said receptacle means,
    a pair of elongated rollers disposed alongside each other near said receptacle means and adapted to receive fruit thereon from said receptacle means when said gate means is opened,
    means for opening said gate means,
    means for counterrotatingly driving said rollers;
    means formed on said rollers for moving fruit disposed thereon to a predetermined position on said rollers when said rollers are rotated.

11. The fruit handling system of claim 10 wherein:
    said rollers are in rolling contact with each other whereby the rolling action of said rollers is effective to destem the fruit disposed thereon.

12. The fruit handling system of claim 10 wherein:
    said opening means is actuated by the fruit picking panel.

13. The fruit handling system of claim 10 wherein:
    said moving means comprises helical grooves formed along the surface of said rollers, said grooves being matched and oppositely directed so that fruit in contact with said grooves during rotation of said rollers is moved to a predetermined position on said rollers.

14. The fruit handling system of claim 10 including:
    conveyor means for receiving fruit from said rollers and conveying it to a storage tank.

15. The fruit handling system of claim 10 including:
    platform means connected to the fruit harvesting unit actuatable by said gate means to provide in association with said opened gate means a ramp over which fruit may pass to move from said receptacle means to said rollers.

(References on following page)

References Cited

UNITED STATES PATENTS

| | | | |
|---|---|---|---|
| 1,835,190 | 12/1931 | Stansbury | 146—55 |
| 2,595,641 | 5/1952 | Clearwater | 146—55 X |
| 3,036,613 | 5/1962 | Minera | 146—55 |
| 3,153,311 | 10/1964 | Pool | 56—328 |
| 3,176,739 | 4/1965 | Minera | 146—55 X |

W. GRAYDON ABERCROMBIE, *Primary Examiner.*

U.S. Cl. X.R.

146—55